(12) United States Patent
Charnay et al.

(10) Patent No.: US 11,167,890 B2
(45) Date of Patent: Nov. 9, 2021

(54) CLOSURE CAP FOR PACKAGING A COSMETIC PRODUCT

(71) Applicant: L'Oreal, Paris (FR)

(72) Inventors: Patrick Charnay, Clichy (FR); Thomas Boudot, Clichy (FR); Stéphanie Marcq, Clichy (FR); Laurence Gerard, Clichy (FR)

(73) Assignee: L'Oreal, Paris (FR)

( * ) Notice: Subject to any disclaimer, the term of this patent is extended or adjusted under 35 U.S.C. 154(b) by 118 days.

(21) Appl. No.: 16/499,134

(22) PCT Filed: Mar. 22, 2018

(86) PCT No.: PCT/EP2018/057249
§ 371 (c)(1),
(2) Date: Sep. 27, 2019

(87) PCT Pub. No.: WO2018/177866
PCT Pub. Date: Oct. 4, 2018

(65) Prior Publication Data
US 2021/0086953 A1  Mar. 25, 2021

(30) Foreign Application Priority Data
Mar. 27, 2017 (FR) ...................................... 1752514

(51) Int. Cl.
*B65D 41/04* (2006.01)
*B29D 1/00* (2006.01)

(52) U.S. Cl.
CPC ................ *B65D 41/04* (2013.01); *B29D 1/00* (2013.01)

(58) Field of Classification Search
CPC ...... B29D 1/00; B65D 39/00; B65D 39/0017; B65D 39/0023; B65D 39/0052;
(Continued)

(56) References Cited

U.S. PATENT DOCUMENTS

| 4,170,316 A | 10/1979 | LaBarbera | |
| 5,289,950 A * | 3/1994 | Gentile | B65D 47/32 222/142.3 |
| 2014/0103043 A1* | 4/2014 | Lonsway | B65D 41/02 220/255 |

FOREIGN PATENT DOCUMENTS

EP  0 755 872 A1  1/1997

OTHER PUBLICATIONS

International Search Report and Written Opinion dated May 15, 2018, issued in corresponding International Application No. PCT/EP2018/057249, filed Mar. 22, 2018, 2 pages.

* cited by examiner

*Primary Examiner* — Anthony D Stashick
*Assistant Examiner* — Elisabeth Sullivan
(74) *Attorney, Agent, or Firm* — Christensen O'Connor Johnson Kindness PLLC

(57) ABSTRACT

The closure cap for a container comprises an internal fastening skirt (16), an external skirt (18) radially surrounding said internal skirt at least partially, and a front wall (14) from which said skirts extend. The internal skirt (16) has a variable thickness in the direction of its axial length, said thickness being at a minimum at least for a proximal portion (22) of said skirt which extends from the front wall (14). The internal skirt (16) comprises the proximal portion (22) with a thickness E that is substantially constant, a distal portion (24) with a thickness $E_2$ that is substantially constant and greater than the thickness $E_1$, and a connecting portion (26) that connects the proximal portion and the distal portion and has a variable thickness $E_3$ along its length. The axial length of the proximal portion (22) of the internal skirt varies around the circumference of said skirt.

8 Claims, 4 Drawing Sheets

(58) Field of Classification Search
CPC .. B65D 39/0064; B65D 39/007; B65D 41/04; B65D 41/62; B65D 41/0421; B65D 41/0414; B65D 43/0225; B65D 2539/00
USPC ........................................................ 215/329
See application file for complete search history.

CLOSURE CAP FOR PACKAGING A COSMETIC PRODUCT

The present invention relates to a closure cap or lid that is able to be fastened removably to a container produced for example in the form of a pot, bottle, etc.

The invention is particularly suitable for sealing containers for storing cosmetic, pharmaceutical or dermato-pharmaceutical products. Such products can, for example, be dispensed in an aqueous form, in the form of an oil, a milk, a cream, a paste, a gel, a foam, etc.

In the field of cosmetics, it is relatively common to use closure caps produced by moulding a synthetic material. Conventionally, such a cap comprises an internal skirt provided on the inside with a screw thread for fastening to the associated container, an external enclosing skirt surrounding the internal skirt and a front wall to which the skirts are joined. Such caps are also widely used in the field of sealing bottles containing liquids to be drunk. For more details on the design of these caps, reference may be made for example to the Patent Application FR-A1-2 523 551.

Conventionally, the internal skirt of the cap has a substantially constant thickness. However, for a cap produced by moulding a synthetic material, this constant thickness of the internal skirt leads to the formation of shrinkage marks or deformations on the upper face of the front wall of the cap during the cooling of the material. These marks associated with the shrinkage of the synthetic material are visible to the consumer.

For these closure caps, it will thus be understood that there is a need to minimize such surface defects which impair the aesthetic appearance and the perceived quality of the caps to a consumer.

The subject of the invention is a closure cap for a container, comprising an internal skirt for fastening said cap to the container, an external skirt radially surrounding said internal skirt at least partially, and a front wall from which said internal and external skirts extend. The cap is produced by moulding at least one synthetic material.

According to one general feature of the cap, the internal skirt has a variable thickness in the direction of its axial length. Said thickness is at a minimum at least for a proximal portion of said skirt which extends from the front wall.

The "thickness of the internal skirt" is understood to be the thickness measured perpendicularly to the axis of the cap between the outer surface and the bore of said skirt. This thickness is measured independently of the reliefs that can be provided on the bore of the internal skirt, for example a screw thread, and independently of the reliefs or recesses that can be formed on the outer surface of the skirt.

The local reduction in the thickness of the internal skirt in the junction zone with the front wall makes it possible to enable uniform cooling of the cap after moulding. Thus, the risk of the appearance of shrinkage marks on the front wall of the cap is limited.

With the particular design of the internal skirt, an undercut part is formed in the outer surface thereof in the junction zone with the front wall. "Undercut part" is understood to be the portions of the outer surface of the internal skirt which oppose the demoulding of the cap.

The internal skirt comprises the proximal portion with a thickness $E_1$ that is substantially constant, a distal portion with a thickness $E_2$ that is substantially constant and greater than the thickness $E_1$, and a connecting portion that connects the proximal portion and the distal portion and has a variable thickness $E_3$ along its length. At least the connecting portion forms the undercut part of the internal skirt.

In order to enable uniform cooling of the cap, the variation in the thickness $E_3$ of the connecting portion may be gradual.

According to another general feature of the cap, the axial length of the proximal portion of the internal skirt varies around the circumference of said skirt.

According to a first embodiment, the variation in the axial length of the proximal portion of the internal skirt is linear over a first angular sector of 180° of said skirt with a coefficient having a value C, and linear over a successive second angular sector of 180° of said skirt with a coefficient having a value –C. In other words, the axis of the connecting portion of the internal skirt is inclined with respect to the central axis of the cap.

Thus, the risk of the appearance of surface defects on the upper face of the front wall, it being possible for said surface defects to be formed during the demoulding of the cap by force, as a result of the force exerted by an outer core of the associated mould on the connecting portion of this cap, is substantially reduced.

Specifically, in the zone of the connecting portion of the internal skirt, contact between this portion and the outer core of the mould is not continuous in the circumferential direction in a plane perpendicular to the axis of the cap.

Compared with a configuration in which the axial length of the proximal portion is constant around the circumference of the internal skirt, this makes it possible to minimize the risk of the appearance of surface defects on the front wall on account of the demoulding of the cap by force.

Preferably, the linear variation in the axial length of the proximal portion is such that the orthogonal projection onto the central axis of said cap of the proximal point of a lower edge of the connecting portion of the internal skirt is offset axially towards the front wall with respect to the orthogonal projection onto said axis of the distal point of an upper edge of said connecting portion.

The "proximal point of the lower edge of the connecting portion" is understood to be the point of this lower edge which is situated axially closest to the front wall. The "distal point of the upper edge of the connecting portion" is understood to be the point of the upper edge which is situated axially furthest away from the front wall.

Such a disposition ensures that the orthogonal projection onto the central axis of the cap of the contact line between the outer core of the mould and the connecting portion of the internal skirt that is situated closest to the front wall does not intersect or overlap the contact line between this core and the connecting portion situated furthest away from the front wall. This further limits the risk of the appearance of surface defects on the front wall of the cap, it being possible for said surface defects to be formed by the demoulding force exerted by the outer core of the mould.

According to an alternative second embodiment of the design of the axial length of the proximal portion which varies around the circumference of the internal skirt, this variation may be sinusoidal around said circumference. The proximal portion of the internal skirt of the cap thus comprises a plurality of undulations which each extend axially and are successive in the circumferential direction. In this zone, contact between the internal skirt and the outer core of the mould is discontinuous in the circumferential direction in a plane perpendicular to the axis of the cap.

In one embodiment, the internal skirt is provided on the inside with at least one screw thread for fastening said cap to the container. Said screw thread may be helical in order to screw said cap onto the container. Alternatively, it is possible to provide a screw thread that makes it possible to fasten the cap to the container by snap-fastening or clip-fastening.

In order to enable good leaktightness between the associated container and the cap to be obtained, the latter may accommodate an inserted seal mounted in abutment against the front wall of the cap. In this case, it is possible to provide, on the internal skirt of the cap, at least one retaining bulge for the axial retention of the seal against the front wall. Alternatively, this axial retention may be realized by the screw thread of the internal skirt.

Advantageously, the cap according to the invention may be used for a container for storing a cosmetic, or dermatological, product, notably in the form of a cream, foam, gel, milk or paste. It may, notably, be a body hygiene product, a hair styling product, a skincare or haircare product, a makeup product, or a sun protection product.

The cap may also be used in other applications, for example for sealing bottles containing liquids to be drunk.

The present invention will be understood better from studying the detailed description of embodiments that are given by way of entirely non-limiting example and are illustrated by the appended drawings, in which:

FIG. 1 shows a lid or cap, denoted by the overall reference numeral 10, which is provided to be screwed onto a container for storing a product (not shown).

Figure 1:
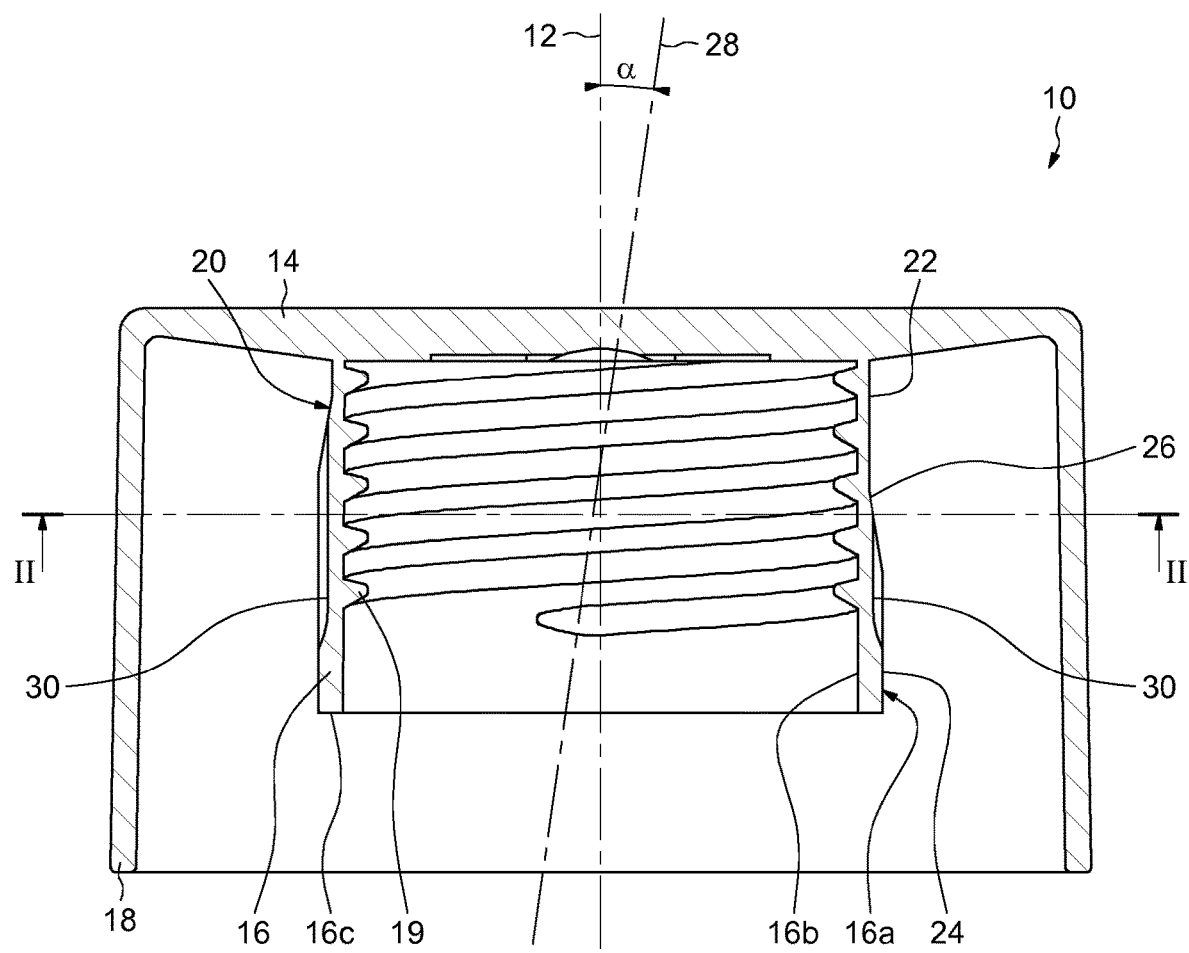
FIG. 1 is a cross-sectional view of a closure cap according to a first exemplary embodiment of the invention.

The cap 10 is shown in a position presumed to be vertical and extends along a central median axis 12. The cap 10 is produced in one piece by moulding a synthetic material, for example polypropylene (PP), polyethylene (PE), acrylonitrile butadiene styrene (ABS), polyethylene terephthalate (PET), etc.

As will be described in more detail below, the cap 10 is designed to limit the appearance of any surface defects associated with manufacturing by moulding.

The cap 10 comprises an upper front end wall 14, an internal skirt 16 and a peripheral external skirt 18 surrounding the internal skirt. The skirts 16, 18 are centred on the axis 12. The skirts 16, 18 extend axially from the lower face of the front wall 14. The front wall 14 extends radially.

The external skirt 18, which is coaxial with the axis 12, axially continues a large-diameter edge of the front wall 14. The external skirt 18 radially surrounds the internal skirt 16, remaining radially away from the latter. The skirt 18 in this case extends axially beyond the internal skirt 16. The external skirt 18 forms an enclosing skirt of the cap 10. In the exemplary embodiment illustrated, the external skirt 18 has a circular cross section. Alternatively, it may be possible to provide a polygonal, notably square, cross section or an oval cross section, etc.

The internal skirt 16 of the cap is delimited in the radial direction by an outer surface 16a and by an opposite inner surface forming a bore 16b. The bore 16b is coaxial with the axis 12 and has a cylindrical shape. The internal skirt 16 also comprises a front face 16c forming the free end of said skirt. The front face 16c is in this case set back axially from the external skirt 18.

On the inside, the internal skirt 16 comprises a helical screw thread 19 for screwing the cap 10 onto the associated container. The screw thread 19 extends radially inwards from the bore 16b. The screw thread 19 is in this case continuous in the circumferential direction. In a variant, it is possible to provide a segmented screw thread, i.e. one that is discontinuous in the circumferential direction. The internal skirt 16 allows the cap to be mounted on and fastened to the associated storage container. In the exemplary embodiment illustrated, the screw thread 19 comprises two threads. In a variant, the screw thread 19 may comprise a single thread or a greater number of threads than two.

In order to limit the appearance of material shrinkage marks on the upper face of the front wall 14 of the cap after moulding, an undercut part 20 is formed on the outer surface 16a of the internal skirt 16. To this end, the undercut part 20 is formed such that, in the junction zone of the internal skirt 16 with the lower face of the front wall 14, the thickness of the internal skirt 16 is reduced compared with the thickness of the rest of the skirt. In other words, the internal skirt 16 has a variable thickness in the direction of its axial length, this thickness being at a minimum in the junction zone with the front wall 14.

The internal skirt 16 comprises a proximal portion 22 with a thickness $E_1$ that is substantially constant, said proximal portion 22 extending from the lower face of the front wall 14, a distal portion 24 with a thickness $E_2$ that is substantially constant and greater than the thickness $E_1$, and a connecting portion 26 connecting said portions together. The connecting portion 26 has a thickness $E_3$ that varies along its length. The thickness of the connecting portion 26 increases gradually from the proximal portion 22 to the distal portion 24. The connecting portion 26 has a frustoconical shape. In the exemplary embodiment illustrated, the thickness $E_1$ of the proximal portion 22 is the minimum thickness of the internal skirt 16, while the thickness $E_2$ of the distal portion 24 is the maximum thickness of said skirt. By way of indication, for a maximum diameter of the internal skirt 16 equal to 26 mm, the thickness $E_1$ of the proximal portion 22 may be equal to 0.6 mm at the junction with the front wall 14, and the thickness $E_2$ of the distal portion 24 may be equal to 1.3 mm.

In the exemplary embodiment illustrated, the axial length of the proximal portion 22 varies around the circumference of the internal skirt 16. The variation in the axial length of the proximal portion 22 is linear over a first angular sector of 180° with a coefficient having a value C, and linear over a successive second angular sector of 180° with a coefficient having a value −C. Thus, the connecting portion 26 is inclined with respect to the axis 12 of the cap. The longitudinal axis 28 of the connecting portion 26 forms, with the central axis 12 of the cap, a non-zero inclination angle α. By way of indication, the value of the angle α may be, for example, between 8° and 15°, and preferably equal to 10°.

Figure 2:
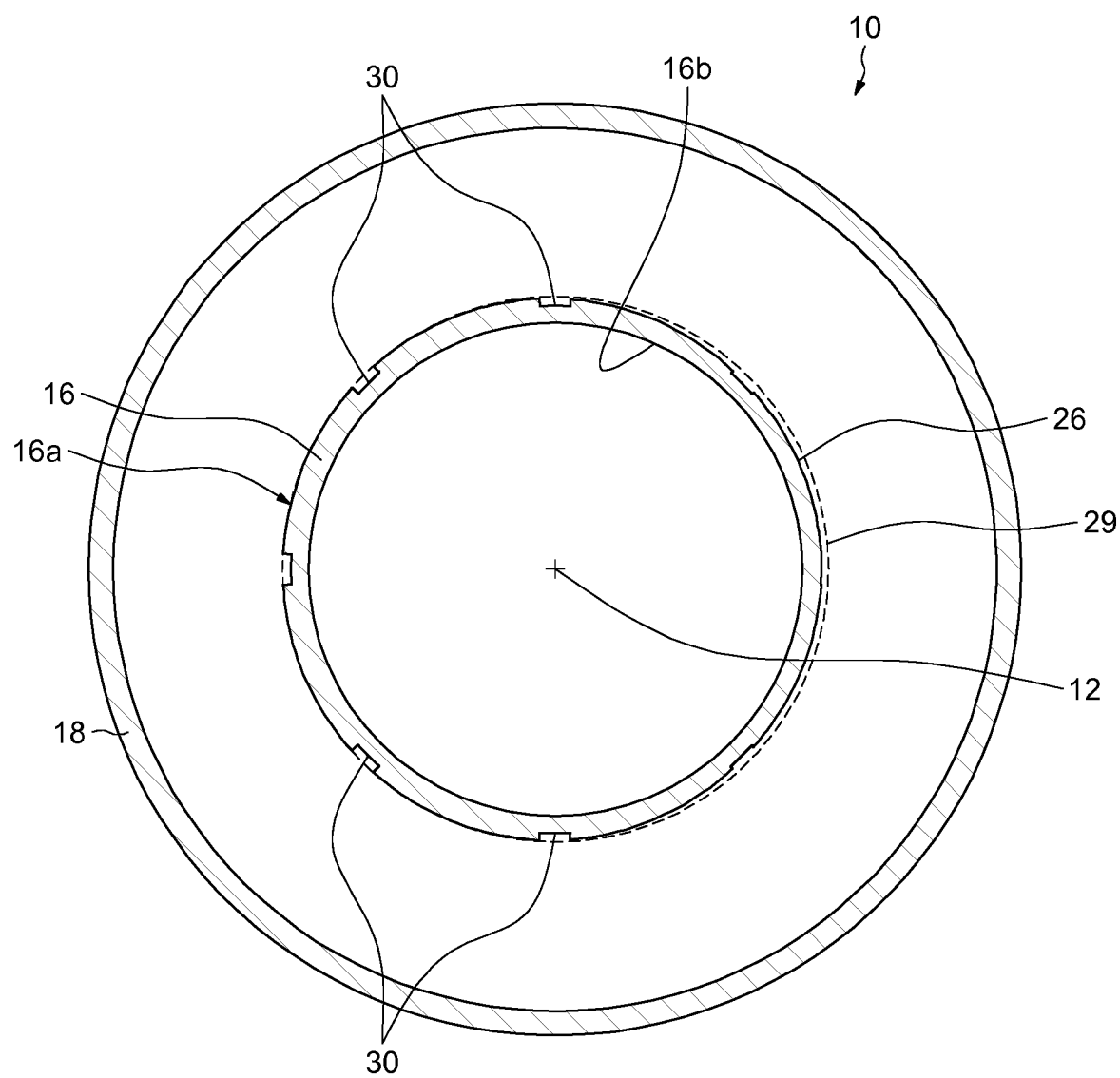
FIG. 2 is a cross section of the cap along the axis II-II in FIG. 1.

As is visible in FIG. 2, in a radial plane perpendicular to the axis 12 of the cap, the radial distance between this axis and the connecting portion 26 is not uniform around the circumference of said portion. This results from the inclination of the connecting portion 26, which is not centred on the axis 12 of the cap. In order to illustrate the fact that the radial distance between the axis and the connecting portion 26 is variable in the radial plane in question, FIG. 2 shows, with a dashed line, a circle, referenced 29, of axis 12 and with a radius equal to said maximum radial distance.

Figure 3:
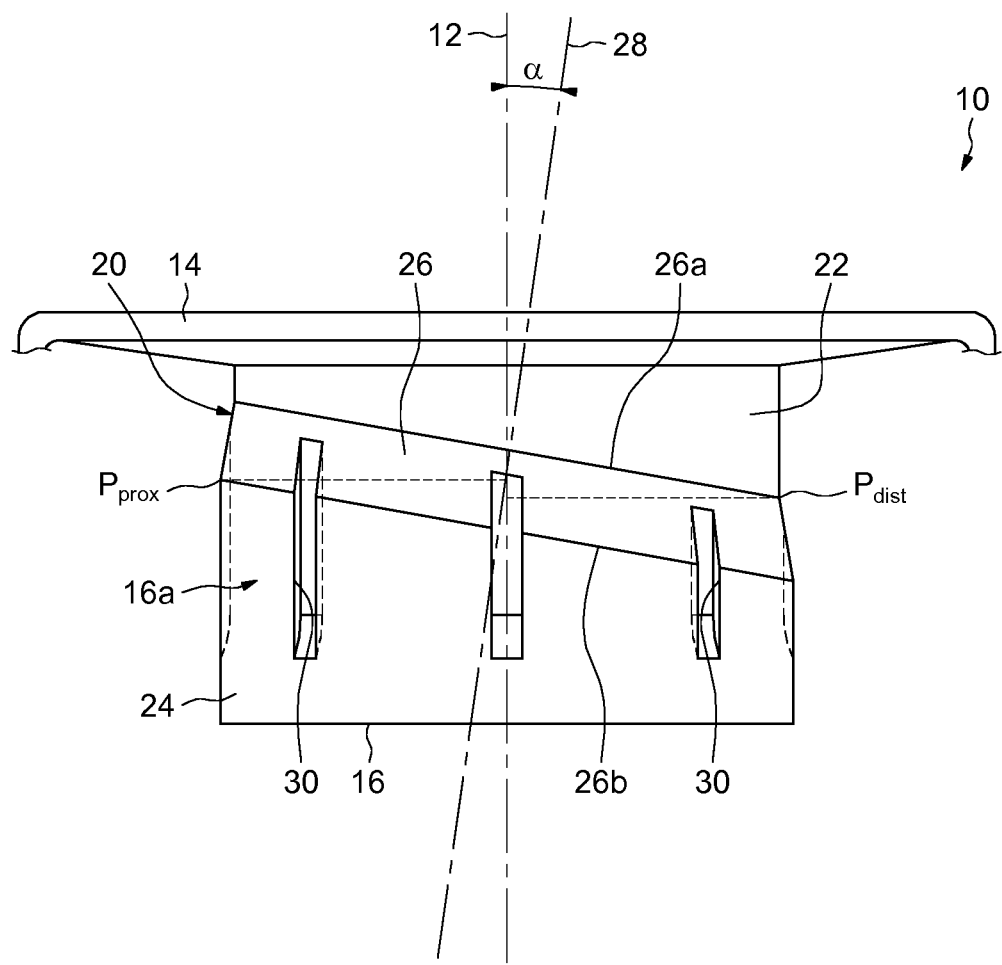
FIG. 3 is a front view of the cap from FIG. 1, in which an external enclosing skirt has not been depicted.

Referring now to FIG. 3, the connecting portion 26 is delimited in the axial direction by a circular upper edge 26a and a circular lower edge 26b. Preferably, the variation in the axial length of the proximal portion 22 of the internal skirt is chosen such that the orthogonal projection onto the axis 12 of the cap of the proximal point, referenced $P_{prox}$, of the lower edge 26b is offset axially towards the front wall with respect to the orthogonal projection onto the axis of the distal point, referenced $P_{dist}$, of the upper edge 26a.

The proximal portion 22 of the internal skirt extends axially between the upper edge 26a of the connecting portion and the lower face of the front wall 14. In the exemplary embodiment illustrated, the proximal portion 22 is in the form of a frustoconical portion that is centred on the axis 12 of the cap and flares radially outwards towards the front face 16c of the internal skirt. The gradient of the proximal portion 22 is low, for example around 2° to 3°. Thus, in this exemplary embodiment, the undercut part 20 of the internal skirt is formed by the proximal portion 22 and the connecting portion 26. Alternatively, the proximal portion 22 may be in the form of an axial cylindrical portion. In this case, the undercut part 20 of the internal skirt is formed only by the connecting portion 26.

The distal portion 24 of the internal skirt extends axially from the lower edge 26b. The distal portion 24 delimits the front face 16c of the internal skirt. The distal portion 24 has a cylindrical shape in this case.

In the exemplary embodiment illustrated, the cap 10 comprises a plurality of grooves 30 formed in the outer surface 16a of the internal skirt. The grooves 30 are parallel to one another. The grooves 30 are disposed axially between the front face 16c of the skirt and the upper edge 26a of the connecting portion. Each groove 30 extends radially into the thickness of the internal skirt 16 without leading out into the bore 16b of said internal skirt. The grooves 30 do not lead out onto the front face 16c. The grooves 30 extend in this case axially along the outer surface 16a.

As is visible in FIGS. 2 and 3, the grooves 30 are spaced apart from one another in the circumferential direction, in this case regularly. The grooves 30 in this case have an axial dimension which varies gradually in the circumferential direction around the outer surface 16a. As will be described in more detail below, the grooves 30 form anti-rotation means during the demoulding of the cap 10.

Figure 4:
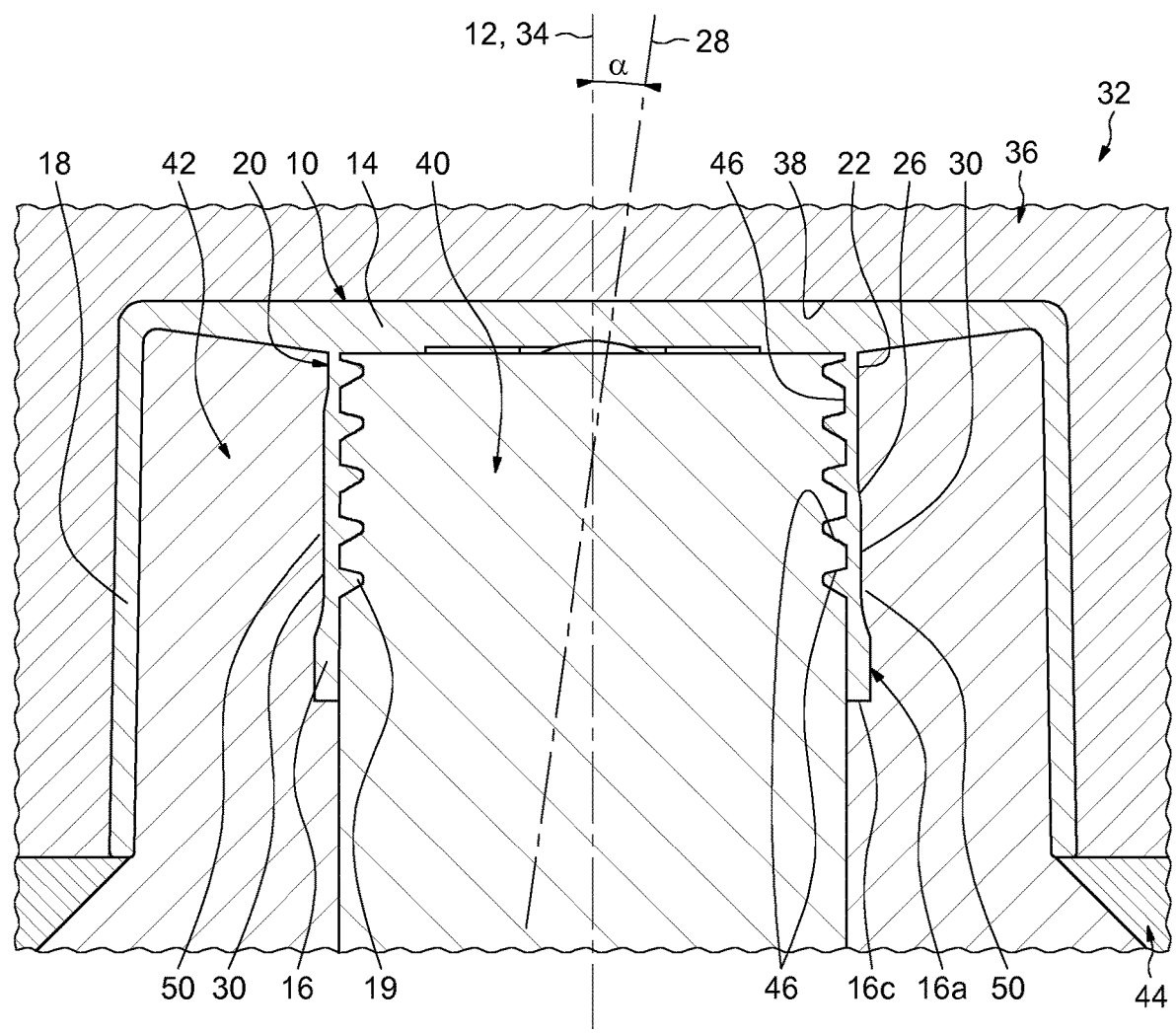
FIG. 4 is a schematic cross-sectional view showing the cap from FIG. 1 in a moulding position inside a mould.

FIG. 4 schematically shows, in cross section, the cap 10 in a moulding position inside a manufacturing mould 32. The mould 32, of axis 34 coaxial with the axis 12 of the cap, mainly comprises a matrix 36 provided with a cavity 38 with a shape corresponding to the outer shape of the cap, and an inner core 40 and outer core 42 for moulding the inner shapes thereof. The mould 32 also comprises an ejection support 44 interposed axially between the matrix 36 and the outer core 42.

The inner core 40, of axis 34, comprises, on its outer surface, helical grooves 46 for moulding the threads of the screw thread 19 of the internal skirt of the cap. The outer core 42 has an annular shape. The outer core 42 radially surrounds the inner core 40 and has a shape complementary to that of the bore of the external skirt 18 of the cap and of the outer surface of the internal skirt 16.

The cap 10 is demoulded from the mould 32 as follows:
In a first step, the cores 40, 42 and the cap 10 are withdrawn jointly from the matrix 36 of the mould.

In a second step, the inner core 40 is unscrewed from the bore of the internal skirt 16 of the cap. The grooves 30 made in the outer surface of the internal skirt 16 prevent the cap from rotating during this step of unscrewing the inner core 40. The grooves 30 cooperate with complementary protuberances 50 of the bore of the outer core 42. Alternatively, by replacing the grooves 30, it is possible to provide other means for providing this anti-rotation function of the cap during the unscrewing of the inner core 32. For example, it is possible to provide ribs protruding from the outer surface of the internal skirt 16, and/or teeth formed on the front face 16c of said skirt and/or formed on the lower face of the front wall 14.

Next, during a third step, the cap 10 is demoulded from the outer core 42 by way of the ejection support 44. During this step, the undercut part 20 of the outer surface of the internal skirt 16 and the grooves 30 are demoulded by force. The outer core 42 exerts a demoulding force which tends to deform the internal skirt 16 of the cap radially inwards and to axially stretch said skirt towards the front face 16c.

Given the inclination of the connecting portion 26 of the undercut part 20 of the internal skirt with respect to the axis 12, contact between this connecting portion and the outer core 42 is not continuous in a plane perpendicular to said axis 12. This contact is continuous in a plane which is inclined with respect to the axis 12 and the normal of which corresponds to the axis 28.

Thus, during the demoulding of the undercut part 20 by force, the force exerted by the outer core 42 on the outer surface 16a of the internal skirt in the vicinity of the front wall 14 is limited. Specifically, considering a radial plane perpendicular to the axis 12, the demoulding force is exerted by the core 42 over a limited angular sector. In this radial plane, the internal skirt 16 of the cap is deformed radially inwards and stretched axially only in this angular sector. Thus, the risk of marks being formed on the upper face of the front wall 14 of the cap, it being possible for these marks to be formed during the demoulding of the cap, is limited.

By virtue of the invention, a double-skirt cap is provided on which shrinkage marks that can be formed on the upper face of the front wall of the cap are reduced to a particularly significant extent compared with those which are usually visible with a conventional design of the internal skirt with a constant thickness. This is made possible by the local reduction in the thickness of the internal skirt in the junction zone with the front wall, which enables uniform cooling of the cap after moulding.

The invention claimed is:

1. Closure cap for a container, comprising an internal skirt for fastening said cap to the container, an external skirt radially surrounding said internal skirt at least partially, and a front wall from which said internal and external skirts extend axially, the cap being produced by moulding at least one synthetic material, the internal skirt having a variable thickness in the direction of its axial length, said thickness being at a minimum at least for a proximal portion of said skirt which extends from the front wall, the internal skirt comprising the proximal portion with a first thickness ($E_1$) that is substantially constant, a distal portion with a second thickness ($E_2$) that is substantially constant and greater than the first thickness ($E_1$), and a connecting portion that connects the proximal portion and the distal portion and has a variable thickness ($E_3$) along its length, characterized in that the axial length of the proximal portion of the internal skirt varies around the circumference of said skirt.

2. Cap according to claim 1, wherein the variation in the thickness ($E_3$) of the connecting portion is gradual.

3. Cap according to claim 1, wherein the connecting portion has a frustoconical shape.

4. Cap according to claim 1, wherein the variation in the axial length of the proximal portion of the internal skirt is linear over a first angular sector of 180° of said skirt with a coefficient having a positive value, and linear over a successive second angular sector of 180° of said skirt with a coefficient having a negative value.

5. Cap according to claim 4, wherein the linear variation in the axial length of the proximal portion is such that the orthogonal projection onto the central axis of said cap of the proximal point ($P_{prox}$) of a lower edge of the connecting portion of the internal skirt is offset axially towards the front wall with respect to the orthogonal projection onto said axis of the distal point ($P_{dist}$) of an upper edge of said connecting portion.

6. Cap according to claim 1, wherein the variation in the axial length of the proximal portion of the internal skirt is sinusoidal around the circumference of said skirt.

7. Cap according to claim 1, wherein the internal skirt is provided on the inside with at least one screw thread for fastening said cap to the container.

8. Device for packaging a product, notably a cosmetic product, comprising a container for storing said product, which is provided with a neck, and a closure cap according to claim 1, which is mounted and fastened to said neck.

* * * * *